(12) United States Patent
Torkelson et al.

(10) Patent No.: US 8,961,846 B2
(45) Date of Patent: Feb. 24, 2015

(54) SOLID-STATE SHEAR PULVERIZATION/MELT-MIXING METHODS AND RELATED POLYMER-CARBON NANOTUBE COMPOSITES

(71) Applicant: Northwesten University, Evanston, IL (US)

(72) Inventors: John M. Torkelson, Skokie, IL (US); Junichi Masuda, Shiga (JP)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 14/094,480

(22) Filed: Dec. 2, 2013

(65) Prior Publication Data

US 2014/0088243 A1 Mar. 27, 2014

Related U.S. Application Data

(62) Division of application No. 12/435,978, filed on May 5, 2009, now Pat. No. 8,597,557.

(60) Provisional application No. 61/126,448, filed on May 5, 2008.

(51) Int. Cl.
*B29C 47/00* (2006.01)
*C08K 9/06* (2006.01)

(52) U.S. Cl.
USPC ............ 264/211.21; 264/176.1; 264/920; 523/216; 524/445

(58) Field of Classification Search
USPC ............ 264/211.21, 176.1, 920; 523/216; 524/445
See application file for complete search history.

(56) References Cited

U.S. PATENT DOCUMENTS

| | | | |
|---|---|---|---|
| 4,128,342 A | 12/1978 | Renk | |
| 4,974,439 A | 12/1990 | Saunders et al. | |
| 5,393,630 A | 2/1995 | Bayley et al. | |
| 5,651,928 A | 7/1997 | Hodan et al. | |
| 5,814,673 A | 9/1998 | Khait | |
| 6,180,685 B1 | 1/2001 | Khait | |
| 6,346,303 B1 * | 2/2002 | Shih et al. | 427/571 |
| 7,223,359 B2 | 5/2007 | Torkelson et al. | |
| 2008/0234424 A1 * | 9/2008 | Lee et al. | 524/495 |

FOREIGN PATENT DOCUMENTS

JP 2005082614 A 3/2005

OTHER PUBLICATIONS

Coleman, JN; Khan, U; Blau, WJ; Gun'Ko, YK. Small but strong: A review of the mechanical properties of carbon nanotube-polymer composites. Carbon 44 (2006) 1624-1652.
Furgiuele, N; Lebovitz, AH; Khait, K; Torkelson, JM. Novel Strategy for Polymer Blend Compatibilization: Solid-State Shear Pulverization. Macromolecules. vol. 33, No. 2, Jan. 25, 2000.
Kasimatis, KG; Nowell, JA; Dykes, LM; Burghhardt, WR; Ramanathan, T; Brinson, LK; Andrews, R; Torkelson, JM. Polymer nanocomposites for the real world: achievement of well dispersed nanofiller sheets, nanotubes and nanoparticles by solid-state shear pulverization. Am. Chem. Soc. (2005).
Halpin, JC; Kardos, JL. The Halpin-Tsai Equations: A Review. Polymer Engineering and Science, May 1976, vol. 16, No. 5, pp. 344-352.
Furgiuele, N; Lebovitz, AH; Khait, K; Torkelson, JM. Efficient Mixing of Polymer Blends of Extreme Viscosity Ratio: Elimination of Phase Inversion Via Solid-State Shear Pulverization. Polymer Engineering and Science, Jun. 2000, vol. 40, No. 6, pp. 1447-1457.
Marić, M; Macosko, CW. Improving Polymer Blend Dispersions in Mini-Mixers. Polymer Engineering and Science, Jan. 2001, vol. 41, No. 1, pp. 118-130.
Lebovitz, AH; Khait, K; Torkelson, JM. Sub-micron dispersed-phase particle size in polymer blends: overcoming the Taylor limit via solid-state shear pulverization. Polymer 44 (2003), 199-206.
Tao, Y; Kim, J; Torkelson, JM; Achievement of quasi-nanostructured polymer blends by solid-state shear pulverization and compatibilization by gradient copolymer addition, Polymer 47 (2006) 6773-6781.
Walker, AM; Tao, Y; Torkelson, JM. Polyethylene/starch blends with enhanced oxygen barrier and mechanical properties: Effect of granule morphology damage by solid-state shear pulverization. Polymer 48 (2007) 1066-1074.

* cited by examiner

*Primary Examiner* — Robert D. Harlan
(74) *Attorney, Agent, or Firm* — Reinhart Boerner Van Deuren s.c.

(57) ABSTRACT

Methods using solid-state shear pulverization and melt mixing and related polymer-carbon nanotube composites, as can be used to affect various mechanical and/or physical material properties.

14 Claims, 9 Drawing Sheets

Figure 1
Figure 1A 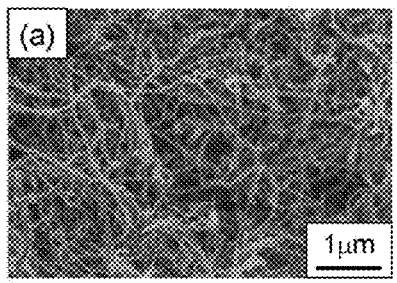 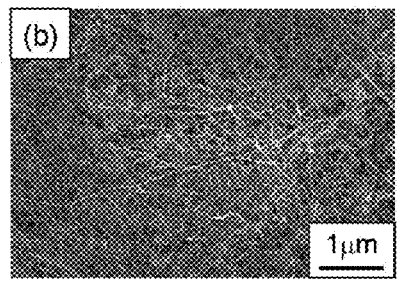 Figure 1B
Figure 1C 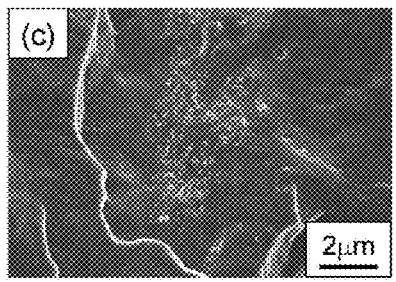 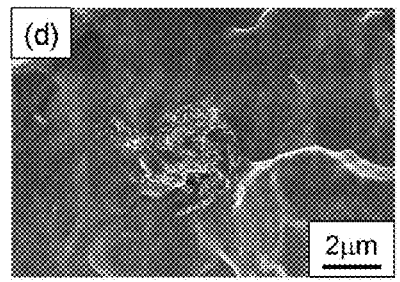 Figure 1D
Figure 1E 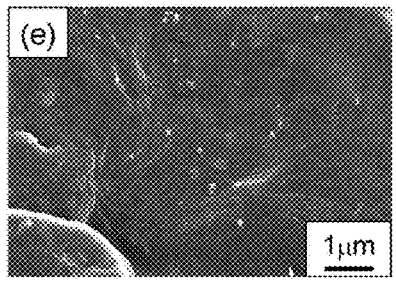 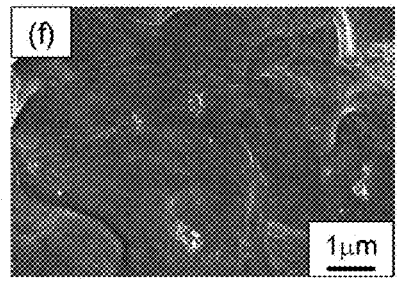 Figure 1F
Figure 1G 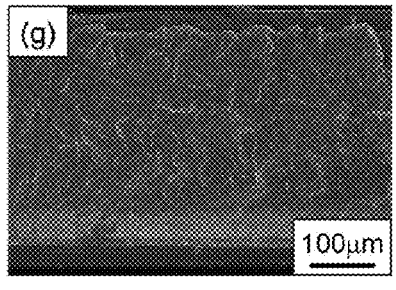 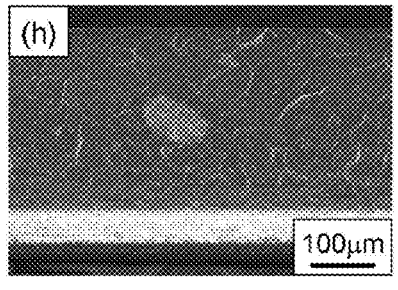 Figure 1H Figure 2
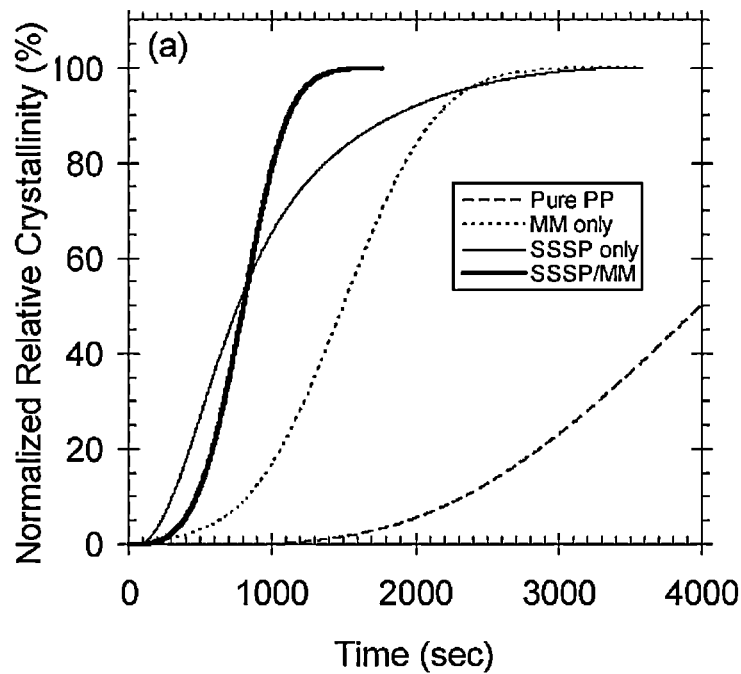
Figure 2A
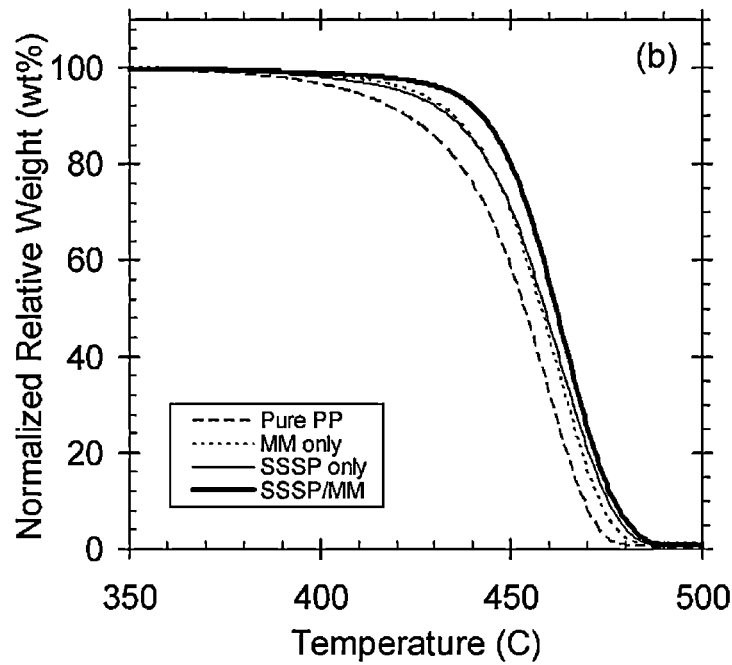
Figure 2B Figure 3
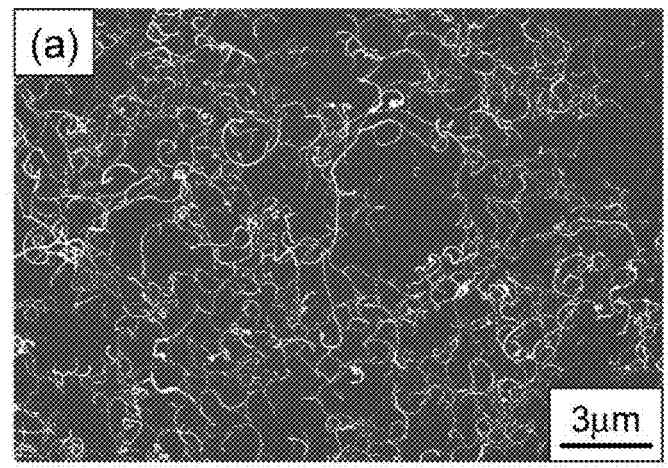
Figure 3A
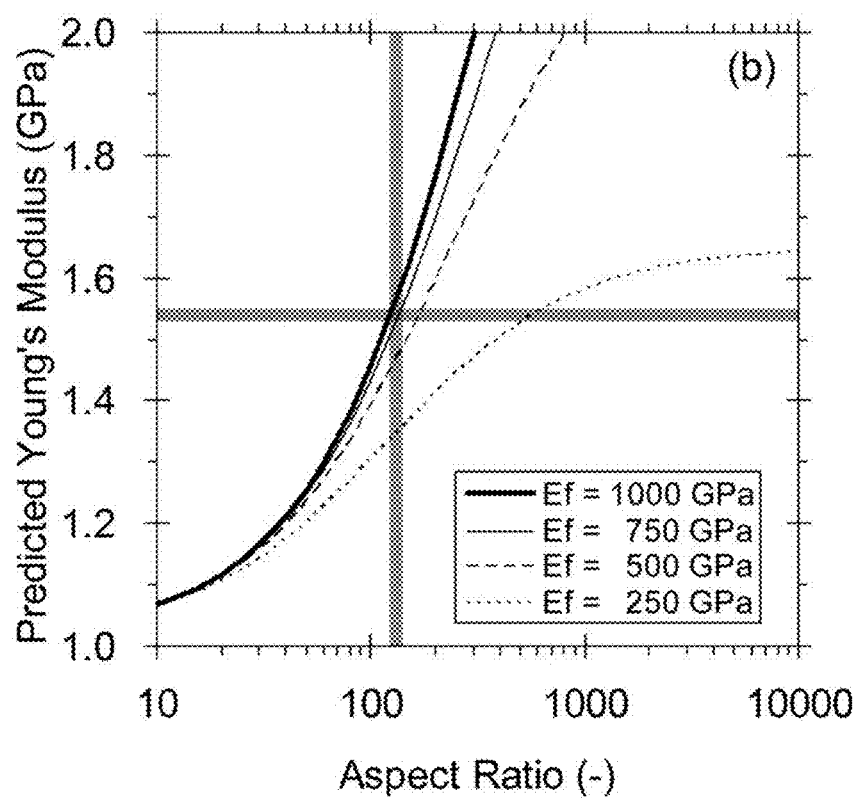
Figure 3B Figure 4
Figure 4A
Figure 4B
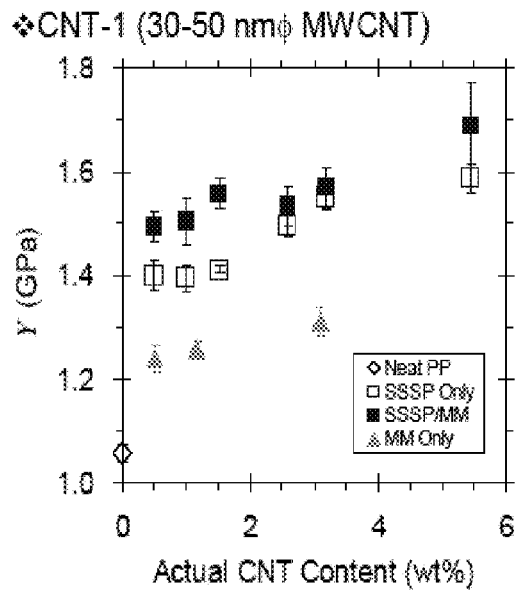
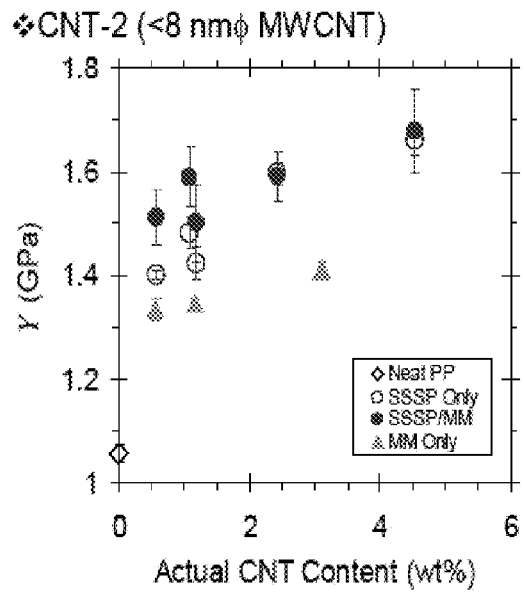

Figure 5
Figure 5A
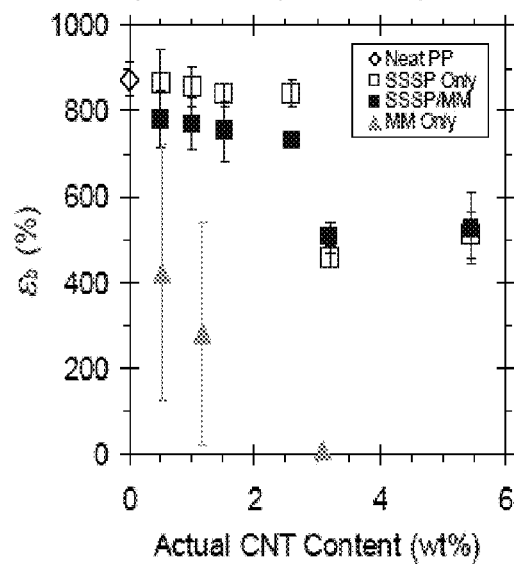
Figure 5B
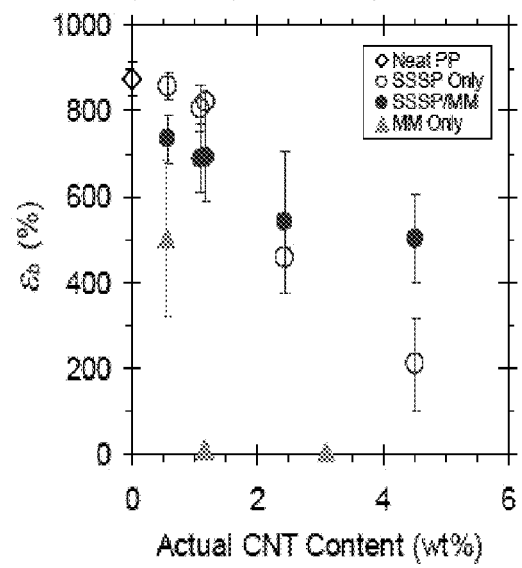

Figure 6
Figure 6A
Figure 6B
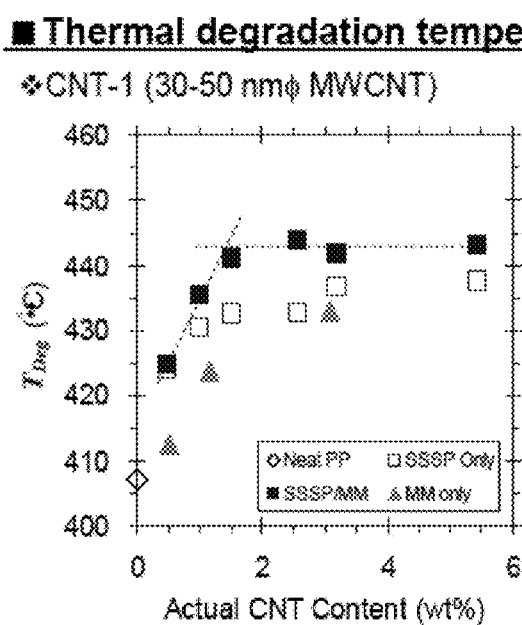
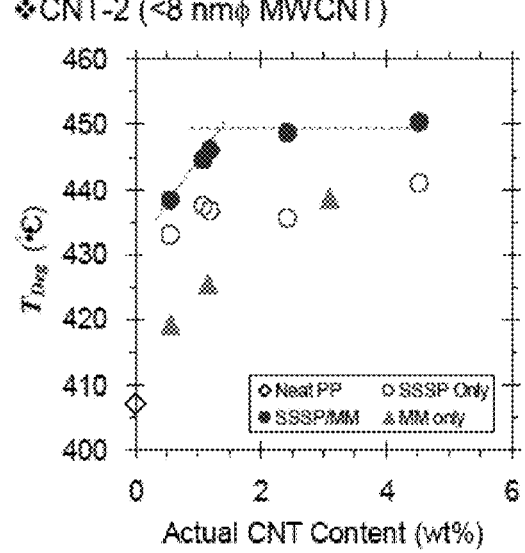

1

SOLID-STATE SHEAR PULVERIZATION/MELT-MIXING METHODS AND RELATED POLYMER-CARBON NANOTUBE COMPOSITES

This application is a divisional of and claims priority benefit of application Ser. No. 12/435,978 filed May 5, 2009 and issued as U.S. Pat. No. 8,597,557 on Dec. 3, 2013, and application Ser. No. 61/126,448 filed May 5, 2008, each of which is incorporated herein by reference in its entirety.

This invention was made with government support under Grant No. DMR-0520513 awarded by The National Science Foundation. The government has certain rights in the invention.

BACKGROUND OF THE INVENTION

Intense research has been focused on polymer nanocomposites because of their potential to dramatically enhance properties relative to neat polymer and to yield multifunctional materials. Since their discovery in the early 1990s, carbon nanotubes (CNTs) have been extensively studied as nanofillers because of their low density, high aspect ratio, and excellent mechanical, electrical, and thermal properties. However, major challenges remain in the development of polymer/CNT nanocomposites, especially as related to CNT dispersion via industrially scalable, environmentally friendly methods and understanding the relationship between dispersion and optimal properties. Several strategies have been studied to achieve well-dispersed polymer/CNT nanocomposites, including melt mixing, polymer/CNT blending in solvent (often with surface functionalization and/or sonication pretreatment), and in situ polymerization. Use of melt mixing alone often leads to limited CNT dispersion in polymer. Blending polymer and in situ polymerization methods can lead to better dispersion, but the former is not environmentally friendly and both methods have limited applicability and scalability.

SUMMARY OF THE INVENTION

In light of the foregoing, it is an object of the present invention to provide a range of polymer-carbon nanotube composites and/or methods for their preparation, thereby overcoming various deficiencies and shortcomings of the prior art, including those outlined above. It will be understood by those skilled in the art that one or more aspect of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of this invention to provide a method of using solid-state shear pulverization (SSSP) for preparation of polymer-carbon nanotube nanocomposite materials, without resort to chemical or thermal nanotube pretreatment or solvent-based blending procedures.

It can be another object of this invention to provide one or more methods of SSSP to enhance one or more mechanical or physical properties of the polymer-carbon nanotube composite, including but not limited to increased Young's modulus and increased yield strength, electrical conductivity, thermal stability and crystallization rate, as compared to the corresponding neat polymer or shear-pulverized, alone, or melt-mixed, alone, composites of the prior art.

Various other objects, features, benefits and advantages of this invention will be apparent from this summary and the descriptions of certain embodiments, and will be readily apparent to those skilled in the art having knowledge of various graphite-based polymer materials and processing techniques. Such objects, features, benefits and advantages will be apparent from the above as taken into conjunction with the accompanying examples, data, figures and all reasonable inferences to be drawn therefrom, alone or with consideration of the references incorporated herein.

In part, the present invention can be directed to a method of preparing a polymer and carbon nanotube composite. Such a method can comprise providing a polymer component and a carbon nanotube mixture; applying a mechanical energy thereto through solid-state shear pulverization in the presence of cooling at least partially sufficient to maintain such a polymer component in a solid state, such pulverization at least sufficient to provide a pulverization product comprising a carbon nanotube component at least partially homogeneously dispersed therein; and melt-mixing such a pulverization product, to provide a polymer-carbon nanotube composite.

In certain embodiments, such a polymer component can be selected from but is not limited to a range of available polyesters and polyolefins. In certain such embodiments, such a polymer component can be a polypropylene. In certain other embodiments, without regard to polymer identity, the nanotube component can comprise about 0.1 wt. % to about 1.0 wt. % ... to about 2.5 wt. % ... to about 5.5 wt. % ... to about 7.5 wt. % ... and/or to about 10.0 wt. % of the component mixture, such amount limited only by process considerations and that to effect a particular mechanical and/or physical property. Regardless, in certain embodiments, such a carbon nanotube component can comprise either single-walled or multi-walled carbon nanotubes. Without limitation, such multi-walled carbon nanotubes can have a diameter dimension less than about 10 nm. Such a composite can be incorporated into any device or article of manufacture benefiting from the mechanical, electrical and/or thermal properties thereof.

In part, the present invention can also be directed to a method of affecting crystallization kinetics of a polymer-carbon nanotube nanocomposite. Such a method can comprise providing a semi-crystalline polymer component and a carbon nanotube component mixture, such a polymer component comprising a polymer comprising less than about 50% crystallinity; applying a mechanical energy to such a mixture through solid-state shear pulverization in the presence of cooling at least partially sufficient to maintain such a polymer component in a solid state, such pulverization at least partially sufficient to provide a pulverization product comprising a carbon nanotube component at least partially homogeneously dispersed therein; and melt-mixing such a pulverization process to provide a nanocomposite of such a mixture. Crystallization kinetic effect can be selected from increased rate of isothermal crystallization and decreased distribution of crystallization time. Polymer and carbon nanotube components can be as discussed above, described elsewhere herein or as would be otherwise known to those skilled in the art. In certain non-limiting embodiments, a polymer component can be a homopolymer selected from a range of available polyesters and polyolefins.

In part, the present invention can also be directed to a method of using solid-state shear pulverization and melt-mixing to affect a mechanical and/or physical property of a polymer-carbon nanotube nanocomposite. Such a method can comprise providing a polymer component and a carbon nanotube component mixture; applying a mechanical energy to such a mixture through solid-state shear pulverization in the presence of cooling at least partially sufficient to maintain such a polymer component in a solid-state, such pulverization at least partially sufficient to provide a pulverization product comprising a carbon nanotube component at least partially homogeneously dispersed therein; and melt-mixing such a pulverization product to provide a nanocomposite of such a mixture. As discussed elsewhere herein, solid-state shear pulverization and/or melt-mixing can be at least partially sufficiently to affect a mechanical and/or physical property of such a mixture, such a property as can be selected from Young's modulus, yield strength, electrical conductivity and thermal stability.

Without limitation, in certain embodiments, such a polymer component can be selected from polyesters and polyolefins. In certain such embodiments, such a polymer component can comprise a polypropylene. Without limitation, as illustrated below, such a polymer component can comprise or can be an unoriented, isotactic polypropylene. Regardless, such a carbon nanotube component can be as discussed above, illustrated elsewhere herein or as would be otherwise understood by those skilled in the art made aware of the invention.

In part, the present invention can also be directed to a polymer composition comprising a polymer component and carbon nanotubes dispersed therein, such a composition substantially absent nanotube agglomeration. Dispersion can be characterized by field-emission scanning electron microscopy and the absence of nanotube agglomeration at micron-length scales under microscopy conditions of the sort described herein or would as otherwise be understood by those skilled in the art made aware of this invention.

In certain non-limiting embodiments, such a polymer component can be selected from homopolymers and copolymers of the sort described herein or as would be otherwise understood by those skilled in the art and aware of the methodologies described herein. In certain such embodiments, such a polymer component can be selected from various polyolefins and polyolefin copolymers. Without limitation, such a polymer component can comprise or can be an unoriented, isotactic polypropylene. Regardless of polymer identity, such a carbon nanotube component can be as discussed above, described elsewhere herein or as would otherwise understood by those skilled in the art made aware of this invention. However processed or fabricated, such a composition can be incorporated into an article of manufacture utilizing the mechanical, electrical and/or thermal properties associated therewith.

BRIEF DESCRIPTION OF THE DRAWINGS

FIGS. 1A-I. Field-emission scanning electron micrographs of carbon nanotubes and nanocomposites: (A) as-received CNT-1 and (B) as received CNT-2, showing their highly entangled natures; (C) 99/1 wt. % PP/CNT-1 and (D) 99/1 wt. % PP/CNT-2 made by SSSP only—small white spots indicate ends of carbon nanotubes; (E) 99/1 wt. % PP/CNT-1 and (F) 99/1 wt. % PP/CNT-2 made by SSSP followed by melt mixing—small white spots indicate ends of carbon nanotubes; low magnification views of 99/1 wt. % PP/CNT-1 indicating (G) the absence of large agglomerates in samples made by SSSP followed by melt mixing and (H) the presence of 10-100 µm agglomerates (whitish ovals in the micrograph) in samples made by melt mixing only; (Note: Micrographs C-H were taken on cryo-fractured surfaces. See Table 1 for CNT content in each nanocomposite or hybrid) and (I) a graphic representation showing the effect of SSSP, only, on Young's modulus.

FIGS. 2A-B. (A) Isothermal crystallization curves at 411 K and (B) thermogravimetric analysis data for neat PP and 99/1 wt. % PP/CNT-1 nanocomposites as a function of process method. (Note: See Table 1 for CNT content in each nanocomposite or hybrid. Crystallinity levels achieved in neat PP and nanocomposites are the same within experimental error.)

FIGS. 3A-B. (A) Scanning electron micrograph showing polydispersity and waviness of individual CNT-1 nanotubes before processing with polymer. (B) Halpin-Tsai model predictions of Young's modulus for PP nanocomposite (1 wt. % nanotube) as a function of CNT aspect ratio. Vertical and horizontal lines indicate the experimentally estimated, representative aspect ratio of CNT-1 before processing and the experimentally measured Young's modulus for the 99/1 wt. % PP/CNT-1 nanocomposite.

FIGS. 4A-B. Effect of CNT content (0.5 wt. % to 5.5 wt. %) and processing method (MM only, SSSP only, and SSSP/MM) on Young's Modulus (Y) for nanocomposites of polypropylene and with CNT-1 (4A) or CNT-2 (4B).

FIGS. 5A-B. Strain at break of PP/CNT nanocomposites. Effects of CNT content (0.5 wt. % to 5.5 wt. %) and process method (MM only, SSSP only, and SSSP/MM) for CNT-1 (5A) and CNT-2 (5B).

FIGS. 6A-B. Thermal degradation temperature (measured as 5 wt. % loss via thermogravimetry under a nitrogen atmosphere) of PP/CNT nanocomposites as a function of CNT content (0.5-5.5 wt. %), CNT type (CNT-1, 6A and CNT-2, 6B) and process method (MM only, SSSP only, and SSSP/MM).

DETAILED DESCRIPTION OF CERTAIN EMBODIMENTS

Figure 1I:
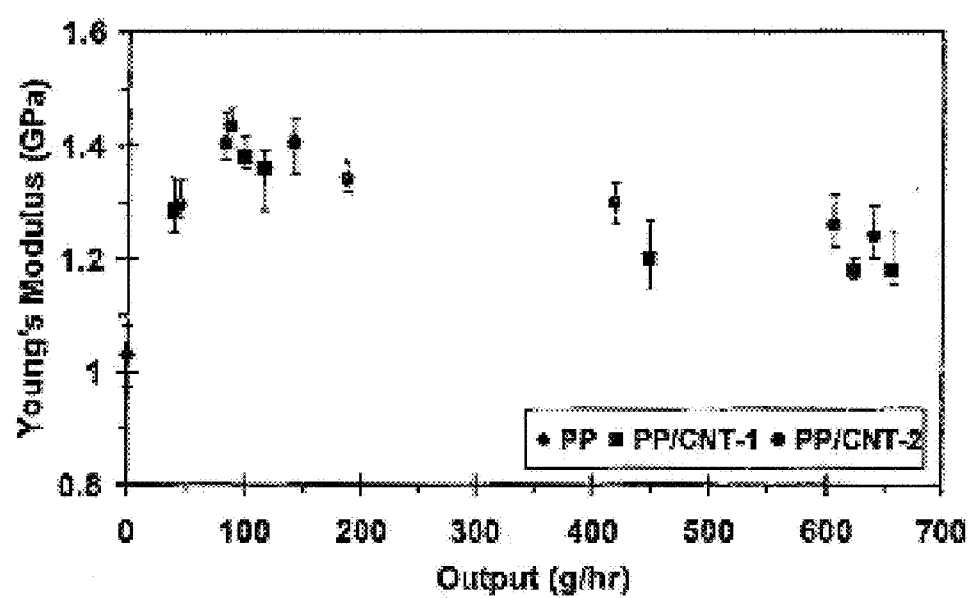

Representative of certain non-limiting embodiments of this invention, and as discussed more fully below, thermal, mechanical and physical properties, as well as crystallization kinetics can be realized for a range of polymers, e.g., without limitation, polyethylene, polypropylene, ε-polycaprolactone, poly(butylene terephthalate) and poly(ethylene terephthalate) and the like.

Regardless, such results and/or enhancements can be obtained using SSSP processing conditions. More generally, pulverization can be accomplished with an SSSP apparatus of the sort described herein or as would otherwise be known in the art, such apparatus, component construction, screw elements, transport elements, kneading or shearing elements, and spacer elements and/or the sequence or design thereof selected or varied as required to accommodate a polymer starting material, pulverization parameters and/or pulverized polymer product. Such apparatus, components and operation are understood by those skilled in the art and, for instance, can be of the sort described more fully in U.S. Pat. Nos. 5,814,673; 6,180,685; 7,223,359 and co-pending application Ser. No. 12/322,396 entitled, Enhancing the Physical Properties of Semi-Crystalline Polymers via Solid-State Shear Pulverization, filed Feb. 2, 2009—each of which is incorporated herein by reference in its entirety.

More specifically, the present invention can comprise use of SSSP to produce polymer-carbon nanotube composites that are not subject to the thermodynamic/kinetic limitations associated with conventional processes. A commercial SSSP apparatus (e.g., a modified twin-screw extruder to apply shear and compressive forces to solid-state materials) can be used in conjunction with a continuous, scalable SSSP process, to provide corresponding polymer nanocomposites comprising well-dispersed unmodified, as-received carbon nanotubes.

In conjunction with SSSP, a melt mixing process can be employed as described below to provide results of the sort reported herein. Melt mixing, also referred to as compounding, can be performed at relatively low temperatures to maintain polymer viscosity at a relatively high value so as to increase shear input. Without limitation, depending upon polymer, copolymer and/or combinations utilized, suitable temperatures can range from about 200° C. up to about 400° C. In certain embodiments, melt mixing can be performed using a single-screw extruder. Commercially, twin-screw extruders are generally utilized. Other apparatus and components include, without limitation, rollers, BANBURY® mixtures and kneaders. Regardless, mixers providing high-shear efficiency are especially useful. Both batch and continuous processing can be employed. Such apparatus, components, operation and parameters thereof—and polymeric materials used therewith—are understood by those skilled in the art and, for instance, can be of the sort described more fully in U.S. Pat. Nos. 4,128,342, 4,973,439, 5,393,630, 5,651,928 and 7,393,288, each of which is incorporated herein by reference in its entirety.

In various non-limiting embodiments, as discussed below, a continuous, solventless, scalable SSSP process can be employed in conjunction with melt mixing (MM) to produce well-dispersed polymer/multiwall CNT (MWCNT) nanocomposites. With SSSP, in the context of certain such embodiments and without limitation as to any one theory or mode of operation, continuously generated deformation energy can be partially stored in the solid-state material and then released by creating new surfaces, resulting in dispersion. SSSP with accompanying mechanochemical effects can result in nanoscale mixing free from thermodynamic limitations. In particular, using a solventless, two-step SSSP-plus-MM process, heavily entangled, unmodified MWCNTs can be well dispersed in polypropylene (PP). With about 50-about 70% increases in Young's modulus observed in conjunction with certain embodiments (e.g., as can vary with CNT wt. %), this invention provides the largest improvement in Young's modulus ever reported for unoriented, isotactic PP/MWCNT nanocomposites.

With reference to the following examples, FIG. 1 shows morphologies of one as-received CNT, CNT-1 and another type, CNT-2 and the 99/1 wt. % PP/CNT-1 and 99/1 wt. % PP/CNT-2 hybrids after SSSP, after SSSP followed by MM, and after MM only. (CNT lengths and diameters are described in the examples.) As-received CNTs are in ~10 μm minimum-size agglomerates. FIGS. 1A and 1B illustrate the heavily entangled nature of CNTs within these agglomerates, especially CNT-2. In nanocomposites made by SSSP, the CNT agglomerates are sharply reduced in size, forming loose structures interpenetrated by PP (FIGS. 1C-D).

FIG. 1i shows the effect of SSSP, only, output on the Young's moduli of 99/1 wt. %, PP/CNT-1 and PP/CNT-2 nanocomposites. Young's moduli for both composites increased in the lower output range (<200 g/hr) while it was almost constant in the higher output range. Within experimental error, Young's modulus was independent of the CNT aspect ratio. Such results can be related to structural origin. As discussed above, agglomerates were confirmed in both nanocomposites, but the composites pulverized at low output exhibited a greater decrease in agglomeration size with pulverization. Also, in contrast with the nanocomposites pulverized at high output, the agglomerates resulting at lower output rate have an unusual structure with partial interpenetration of polypropylene. Such structural differences would affect the Young's modulus of the resulting nanocomposites.

Subsequent MM yields finer dispersion, with CNT-1 almost fully debundled into individual tubes and CNT-2 as individual tubes or in sub-500 nm diameter, loose agglomerates (FIGS. 1E-F). These results indicate that two-step SSSP-plus-MM processing yields dispersion that is a function of CNT dimensions and entanglements in the as-received state. Accordingly, a two-step process can be tailored to CNT characteristics, dispersion and resulting performance parameters desired for a given article or application. In contrast, MM alone leads to little or no CNT dispersion. FIGS. 1G-H compare the absence of agglomerates in PP/CNT-1 made by two-step processing with the presence of 10-100 μm agglomerates in PP/CNT-1 made via MM.

Such conclusions are reinforced by PP crystallization kinetics. FIG. 2A shows that isothermal crystallization of PP/CNT-1 systems at 411 K occurs much more rapidly than in neat PP, presumably because CNTs can act as nucleating agents for PP. Due to poor dispersion, the melt-mixed hybrid exhibits the slowest crystallization of the PP/CNT-1 systems. The nanocomposite made by SSSP exhibits the broadest distribution of crystallization times, with the first 10% of relative crystallization occurring before 300 s and the last 5% occurring after 2200 s. This distribution may originate from the inhomogeneous structure formed by SSSP, with loose CNT agglomerates interpenetrated by PP leading to rapid, local crystallization and isolated regions without CNTs to slow crystallization.

In contrast, without limitation as to theory or mode of operation, the nanocomposite made by two-step processing exhibits a symmetric, sharp crystallization curve, reflecting its homogeneous dispersion. A nanocomposite exhibiting less than 2.5% relative crystallization at a 300 s crystallization time is consistent with the absence of loose CNT agglomerates. These results also indicate that characterization of isothermal crystallization half-time ($\tau_{1/2}$) without consideration of the crystallization-time distribution may lead to incorrect conclusions. With the nanocomposite made by SSSP, $\tau_{1/2}$=760 s; with the nanocomposite made by two-step processing, $\tau_{1/2}$=820 s. Taken alone, these data may suggest that SSSP yields superior dispersion. However, the isothermal crystallization curves are consistent with superior dispersion by two-step processing. (The term "superior dispersion" may depend on the application being considered. For example, regarding the enhancement of mechanical properties, such as considered herein, superior dispersion relates to the maximization of Young's modulus, which may be expected if the nanotubes are dispersed homogeneously at the level of individual nanotubes. However, as can relate to other considerations, when enhanced electrical conductivity is the goal, the development of a contiguous, cellular CNT structure yielding electrical percolation can result in greater property enhancement than a relatively homogeneous CNT dispersion.)

FIG. 2B shows that polymer thermal stability improves with CNT dispersion. In neat PP, $T_{deg}$=407 K. With PP/CNT-1, $T_{deg}$=422 K when made by SSSP and 434 K when made by two-step processing. As shown in Table 1, below, higher $T_{deg}$ values are obtained in PP/CNT-2, with the nanocomposite made by the two-step process yielding a 39 K increase in $T_{deg}$ relative to neat PP. At equal CNT content, thermal stability can be a function of CNT dispersion and diameter. (See, examples, below, for alternate embodiments and corresponding thermal stability data.)

TABLE 1

Mechanical Properties and Degradation Temperatures (Evaluated at 5% Mass Loss by TGA) for Neat PP and PP/CNT-1 and PP/CNT-2 Systems As a Function of Process Method[a]

| system | processing | Young's modulus (GPa) | yield strength (MPa) | strain at break (%) | stress at break (MPa) | $T_{deg}$ (°C.) |
|---|---|---|---|---|---|---|
| none | PP as obtained | 1.03 ± 0.05 | 31.3 ± 0.8 | 790 ± 30 | 44.1 ± 2.2 | 407 |
| PP/CNT-1 | MM only (1.0 wt. %)[b] | 1.26 ± 0.02 | 33.3 ± 0.0 | 283 ± 258 | 30.4 ± 5.0 | 424 |
|  | SSSP only (0.93 wt. %)[b] | 1.40 ± 0.03 | 36.2 ± 0.2 | 841 ± 38 | 50.4 ± 2.0 | 422 |
|  | SSSP/MM (0.93 wt. %)[b] | 1.54 ± 0.02 | 39.3 ± 0.7 | 663 ± 83 | 42.6 ± 3.7 | 434 |
| PP/CNT-2 | MM only (1.1 wt. %)[b] | 1.34 ± 0.01 | 34.7 ± 0.3 | 38 ± 57 | 28.3 ± 8.9 | 428 |
|  | SSSP only (0.92 wt. %)[b] | 1.44 ± 0.03 | 36.8 ± 0.6 | 793 ± 52 | 47.8 ± 2.5 | 434 |
|  | SSSP/MM (0.92 wt. %)[b] | 1.62 ± 0.03 | 40.8 ± 0.9 | 673 ± 93 | 45.4 ± 5.2 | 446 |

Note:
[a]Exact CNT content for each nanocomposite or hybrid was determined by TGA.
[b]Exact values of CNT content in resulting nanocomposites and hybrids as measured by thermogravimetric analysis.

Table 1 compares the tensile properties of the nanocomposites with neat PP. Significant property improvements are demonstrated in nanocomposites made via two-step processing. The representative embodiments used to illustrate this invention, at the CNT wt. % indicated, show Young's modulus increasing by 50% and 57% and yield strength by 27% and 30%, in PP/CNT-1 and PP/CNT-2, respectively. Such increases in Young's modulus relative to neat PP are the largest reported in unoriented, isotactic PP/MWCNT nanocomposite films. (See, examples, below, for alternate embodiments and corresponding Young's moduli and strain at break data.) In contrast, hybrids made by MM exhibit much smaller improvements in Young's modulus and yield strength and major deteriorations in strain at break. (Among the samples listed in Table 1, differences in mechanical properties cannot be attributed to the levels of PP crystallinity, which are identical (46-49% via DSC) within experimental error.)

In order to compare the Young's modulus in PP/CNT-1 made by the two-step process to theoretical predictions for a nanocomposite with well-dispersed CNTs, the Halpin-Tsai model for short-fiber-reinforced composites was employed. (See, Coleman, J. N.; Khan, U.; Blau, W. J.; Gun'ko, Y. K. Carbon 2006, 44, 1624-1652; and Halpin, J. C.; Kardos, J. L. Polym. Eng. Sci. 1976, 16, 344-352.) Micrographs such as FIG. 3A indicate that, before processing, the CNT-1 lengths are 2-9 µm (smaller than the supplier-reported 10-20 µm; see, example 8), resulting in a representative aspect ratio of ~140 (see example 9). This aspect ratio is represented by the vertical line in FIG. 3B. The intersection of this line in FIG. 3B with the Halpin-Tsai model curves, assuming a CNT density of 1.3 g/cm$^3$ (a minimum CNT density in the literature) and CNT moduli of 750 and 1000 GPa, together with a PP density of 0.91 g/cm$^3$ and 1.0 wt. % CNT, yields an estimated theoretical upper bound of the modulus of PP/CNT-1 with homogeneously dispersed CNTs. The intersection indicates that the upper bound is ~1.55 GPa, in excellent agreement with experiment (1.54 GPa). (Assumption of a CNT density exceeding 1.3 g/cm$^3$ yields a smaller predicted modulus from the Halpin-Tsai model, indicating that the experimentally measured modulus is equal to or greater than the value expected from the Halpin-Tsai model.)

Such quantitative agreement reinforces conclusions that PP/CNT-1 is well dispersed and that CNTs do not undergo significant scission or shortening during SSSP. This agreement may also be considered surprising, because wavy CNTs should reduce the nanocomposite modulus in comparison to theory, which assumes straight, well-dispersed CNTs. A possible explanation is related to the polymer-CNT interface: Without limitation, solid-state shear pulverization of PP/CNT nanocomposites may lead to grafts of PP to the CNT, originating from macroradical formation. Literature indicates that after Soxhlet extraction of PP/MWCNT and natural rubber/carbon black hybrids made by batch, solid-state processing, the fillers were coated with polymer, potentially consistent with grafting polymer to filler. Any PP grafted to MWCNTs via SSSP would facilitate stress transfer at nanocomposite interfaces, enhancing Young's modulus.

EXAMPLES OF THE INVENTION

The examples and data provided herein are without limitation and illustrate various aspects and features relating to the composites, compositions and/or methods of the present invention, including the preparation of nanocomposites comprising polymers and as-received carbon nanotube components, as are available through such processes and techniques describes herein. In comparison with the prior art, the present composites, compositions and/or methods provide results and data which are surprising, unexpected and contrary thereto. While the utility of this invention is illustrated through the use of several polymer components and carbon nanotube components, it will be understood by those skilled in the art that comparable results are obtainable with various other polymer and carbon nanotube components, together with a range of corresponding process parameters, as are commensurate with the scope of this invention.

Materials.

Polypropylene (Total Petrochemicals; MI=2.0 g/10 min at 503 K and density of 0.905 g/cm$^3$, reported by supplier) and two types of MWCNT (Cheap Tubes; CNT-1 and CNT-2 with 30-50 nm and <8 nm outer diameters and 10-20 µm and 10-30 µm lengths, respectively, and 95+% purity, reported by supplier) were produced by chemical vapor deposition and used as received.

Example 1

Dry-blended PP/CNT (1.0 wt. %) mixtures were fed to a modified twin screw extruder (Berstorff ZE-25P pulverizer, D=24 and L/D=26.5) with conditions (feed rate, screw speed, screw design, ~273-290 K barrel temperature) selected to optimize CNT dispersion for a range of conditions studied.

Details regarding SSSP process and equipment are known to those skilled in the art made aware of this invention. (See, e.g., Furgiuele, N.; Lebovitz, A. H.; Khait, K.; Torkelson, J. M. *Macromolecules* 2000, 33, 225-228; Furgiuele, N.; Lebovitz, A. H.; Khait, K.; Torkelson, J. M. *Polym Eng. Sci* 2000, 40, 1447-1457; Lebovitz, A. H.; Khait, K.; Torkelson, J. M. *Macromolecules* 2002, 35, 8672-8675; Kasimatis, K. G.; Torkelson, J. M. *PMSE Prepr* 2005, 92, 255-256; Tao, Y.; Kim, J.;

Torkelson, J. M. *Polymer* 2006, 47, 6773-6781; and Walker, A. M.; Tao, Y.; Torkelson, J. M. *Polymer* 2001, 48, 1066-1074; Lebovitz, A. H.; Khait, K.; Torkelson, J. M. *Polymer* 2003 44, 199-206—each of which is incorporated herein by reference in its entirety.) Generally, parameters (screw design, barrel size, feed rate, etc.) can be chosen to yield moderately harsh shear/compression conditions.

As discussed above, pulverization was accomplished on a Berstorff pulverizer apparatus, although various other commercial apparatus can be used, consistent herewith, as would be understood by those skilled in the art. Screw speeds can be chosen to vary between 50 and 400 rpm (e.g., 300 rpm), with feed rates from tens of grams per hour to in excess of 1,000 grams per hour, depending on the polymer and level of graphite being pulverized. Relating more specifically to the embodiments described herein, screw designs typically consisted of two-four screw elements (e.g., two forward elements) in the mixing zone and seven screw elements in the pulverization zone (e.g., four forward elements, two neutral elements and one reverse element with a 23 mm barrel) with the remaining elements as conveying elements. The distribution of forward, reverse and neutral screw elements are chosen as a function of polymer type used in making the nanocomposites. Such screw designs and related apparatus and process parameters would be understood by those skilled in the art made aware of this invention, as described above and/or in conjunction with the aforementioned incorporated references.

Example 2

Melt mixing of the SSSP product was done at 473 K in a cup-and-rotor batch mixer (Atlas Electronic Devices Mini-MAX molder) for 15 min at maximum rotor speed with three steel balls in the cup to introduce extensional flows, a wide range of shear rates and to enhance mixing. (See, Maric, M.; Macosko, C. W. Polym. Eng. Sci. 2001, 41, 118-130.)

On the basis of the resulting dispersed-phase domain size, Maric and Macosko showed that melt mixing of immiscible polymer blends with a MiniMAX mixer containing three small steel balls can yield microstructures with dispersion levels that are comparable to those attained with external, intensive batch mixers and twin-screw extruders. Similar dispersion relationships may be expected for polymer-CNT nanocomposites.

Example 3

Hybrids made by SSSP or MM, only, used similar conditions and CNT content, as described in the preceding examples.

Example 4

Field-emission scanning electron microscopy (FE-SEM) and tensile samples were prepared by compression molding at 493 K. Tensile properties (Sintech 20/G) were measured following ASTM D1708 (e.g., at a head speed of 50 mm/min using dog-bone shaped samples with a gauge length and width of 22 mm and 5 mm, respectively). Morphologies of CNTs and cryo-fractured cross-sections were obtained via FE-SEM (Hitachi S4800; with an accelerating voltage of 3 kV) after sputter coating (Cressington 208HR) with gold/palladium (up to 1.5 nm thickness).

Example 5

Isolated CNTs characterized by FE-SEM were prepared by making a CNT suspension in 50/50 w/w deionized water/2-propanol via low-level bath-type sonication (Branson 1200) for 1.5 h with poly(sodium 4-styrenesulfonate) (Aldrich) as dispersant and casting on plasma-treated Si wafers.

Example 6

Polymer crystallization was measured at 411 K by differential scanning calorimetry (DSC; Mettler Toledo 822e) after annealing at 513 K for 5 min and quenching (50 K/min) to 411 K. The degradation temperature, $T_{deg}$, and CNT content were measured by thermogravimetric analysis (TGA; Mettler Toledo 851e) in nitrogen atmosphere. The value of $T_{deg}$ was determined as the temperature at 5% weight loss.

Example 7

For each hybrid or nanocomposite, about 1.0 wt. % MWCNT was incorporated. For purpose of discussion, hybrids or materials are simply listed as 99 wt. % PP and 1 wt. % CNT. Precise and accurate determinations of CNT content were made via thermogravimetric analysis, with CNT contents ranging from a low of 0.92 wt. % for PP/CNT-2 made by SSSP or SSSP followed by melt mixing to a high of 1.1 wt. % for PP/CNT-2 made by melt mixing only. Table 1 lists exact CNT contents.

Example 8

As the individual tubes associated with CNT-1 had wavy structures when cast on a Si wafer (FIG. 3A). Image analysis was not used to determine tube lengths; rather, lengths were estimated by visual inspection of micrographs. The estimated 2-9 μm lengths of the as-received CNTs are lower than those reported by the supplier (10-20 μm). The values are believed correct as similar results were obtained using very different sonication times.

Example 9

To obtain representative values for the CNT-1 length and diameter, the value midway between the minimum and maximum, which are 2 and 9 μm for the length (from micrographs) and 30 and 50 nm for the diameter (reported by the supplier), was used. The representative CNT-1 aspect ratio of 140 was obtained by dividing the intermediate value of the length by that of the diameter and rounding to two significant digits.

Example 10

Because compression molding conditions can affect CNT dispersion structure, all materials were pressed into sheets under identical conditions. The polymer, nanocomposite or hybrid samples were heat-pressed in a PHI hot press set at 493 K. After preheating for 4 min, the sample was repeatedly pressed for 20 times up to a pressure of 1.5 MPa to remove any air bubble from the sheet and held under a pressure of 3.9 MPa for 1 min. The mold assembly was then transferred to a PHI cold press set at 289 K and held there under a pressure of 1.5 MPa for 5 min. The cooled sheet was then removed and stored in the atmosphere at room temperature.

Example 11

With reference to FIGS. 4A-B, Young's modulus can be increased by as much as 70% with higher CNT content. With melt mixing, an increase of approximately 40% is shown with only 0.5 wt. % CNT.

Example 12

With reference to FIGS. 5A-B, high strain at break present in neat polypropylene is retained in the representative nanocomposites. A moderate decrease after melt mixing indicates homogeneous dispersion. Note, the strain at break does not reduce upon addition of up to 2.5 wt. % CNT via SSSP/MM processing. With the strain at break remaining constant while Young's modulus increases with CNT addition, there is an indication by some measure that the nanocomposite has become much stiffer than the neat polymer without a loss in toughness.

Example 13

With reference to FIGS. 6A-B, a 40-45° C. increase in thermal degradation temperature—and corresponding increase in thermal stability—can be achieved with the present invention.

Example 14

Figure 7:
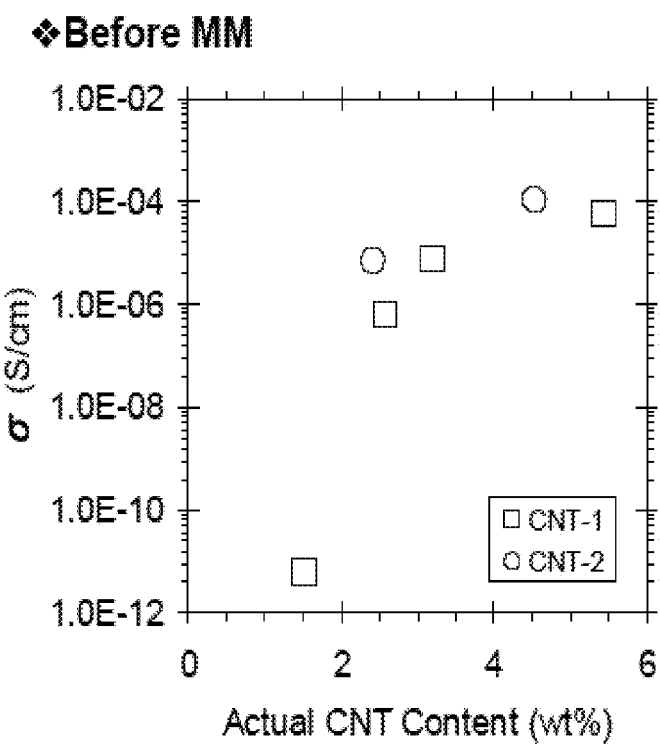
FIGS. 7-8. Effect of CNT content and type on the electrical conductivity of polypropylene/CNT nanocomposites made by SSSP only, (FIG. 7), and as followed by MM (FIG. 8).
Figure 8:
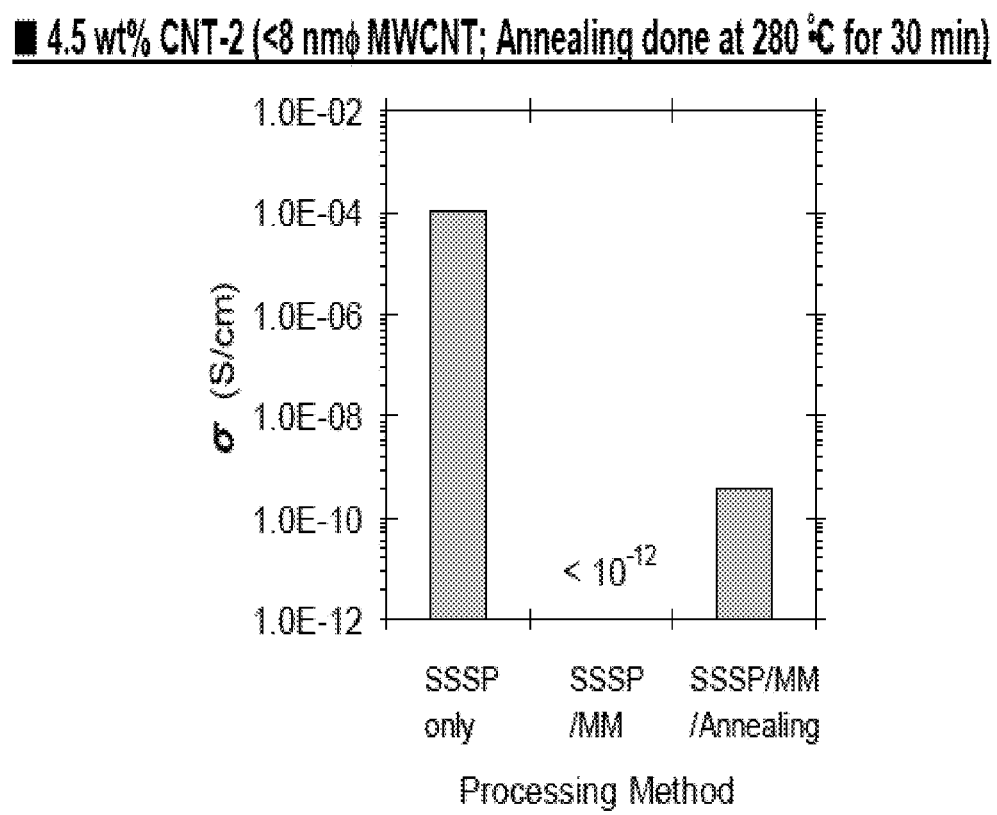

With reference to FIGS. 7-8 and in certain non-limiting embodiments, CNT dispersion to affect and/or optimize mechanical (e.g., thermal or crystallization) properties can differ from dispersion to affect and/or optimize electrical conductivity. For example, improved electrical conductivity was observed at about 2 wt. % CNT using SSSP, alone. (See, FIG. 7.) However, when SSSP processing is followed by MM, a reduction in electrical conductivity is observed. (See, FIG. 8). Without limitation to any one theory or mode of operation, it may be that melt-mixing affects CNT orientation in the nanocomposite and adversely affects the CNT network responsible for percolation across the nanocomposite. However, subsequent annealing was shown to increase electrical conductivity. Regardless, various nanocomposites of this invention demonstrate electrical conductivity sufficient for applications in electrostatic dissipation. Such materials can also be used in various electrostatic painting applications. While such embodiments have been illustrated using multi-walled carbon nanotubes, it would be understood by those skilled in the art that comparable nanocomposites and corresponding materials and device components can be prepared using single-walled carbon nanotubes.

We claim:

1. A polymer composition comprising a polymer component and carbon nanotubes dispersed therein, said composition solventless and substantially absent agglomeration of said nanotubes, said dispersion characterized by field-emission scanning electron microscopy and the absence of nanotube agglomeration at micron length scales under conditions of said microscopy.

2. The composition of claim 1 wherein said carbon nanotubes comprise about 0.1 wt. % to about 10.0 wt. % of said composition.

3. The composition of claim 1 comprising multi-walled carbon nanotubes.

4. The composition of claim 1 wherein said polymer component is selected from homopolymers and copolymers thereof.

5. The composition of claim 4 wherein said polymer component is selected from polyolefins and copolymers of said polyolefins.

6. The composition of claim 5 wherein said polymer component comprises an unoriented, isotactic polypropylene.

7. The composition of claim 6 comprising multi-walled carbon nanotubes.

8. The composition of claim 1 incorporated into an article of manufacture.

9. A composite comprising a solid-state shear pulverization product of a polymer component and a carbon nanotube component, said polymer component selected from homopolymers and copolymers thereof, said composite absent nanotube agglomeration.

10. The composite of claim 9 wherein said carbon nanotubes comprise about 0.1 weight percent to about 10.0 weight percent of said composite.

11. The composite of claim 9 comprising multi-walled carbon nanotubes.

12. The composite of claim 9 wherein said polymer component is selected from polyolefins and copolymers thereof.

13. A composite of claim 12 wherein said polymer component is a polypropylene.

14. The composite of claim 13 comprising multi-walled carbon nanotubes.

* * * * *